US012542098B2

(12) United States Patent
Lee et al.

(10) Patent No.: US 12,542,098 B2
(45) Date of Patent: Feb. 3, 2026

(54) DISPLAY DEVICE AND LUMINANCE DIFFERENCE COMPENSATING METHOD OF THE SAME

(71) Applicant: LG Display Co., Ltd., Seoul (KR)

(72) Inventors: JongBeom Lee, Paju-si (KR); Soyi Lee, Paju-si (KR); Seeun Kim, Paju-si (KR); Jaemin Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/912,029

(22) Filed: Oct. 10, 2024

(65) Prior Publication Data

US 2025/0201175 A1 Jun. 19, 2025

(30) Foreign Application Priority Data

Dec. 15, 2023 (KR) ........................ 10-2023-0183130

(51) Int. Cl.
*G09G 3/32* (2016.01)
*G09G 3/20* (2006.01)

(52) U.S. Cl.
CPC ............. *G09G 3/32* (2013.01); *G09G 3/2092* (2013.01); *G09G 2300/0852* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

2022/0319397 A1* 10/2022 Kim ..................... G09G 3/2003
2023/0178022 A1 6/2023 Seko et al.

FOREIGN PATENT DOCUMENTS

KR 10-2020-0075318 A 6/2020
KR 10-2022-0135552 A 10/2022
TW 202038077 A 10/2020
TW 202316137 A 4/2023

* cited by examiner

*Primary Examiner* — Christopher J Kohlman
(74) *Attorney, Agent, or Firm* — Seed Intellectual Property Law Group LLP

(57) ABSTRACT

According to an aspect of the present disclosure, a luminance difference compensating method of a display device includes measuring a sensing voltage variance at a node between a first driving transistor and a second driving transistor of a sub pixel; calculating a first threshold voltage variance of the first driving transistor from the sensing voltage variance; calculating a second threshold voltage variance of the second driving transistor from the first threshold voltage variance and a prediction information; compensating for a first data voltage based on the first threshold voltage variance; and compensating for a second data voltage based on the second threshold voltage variance, and the prediction information is a difference value of the first threshold voltage variance and the second threshold voltage variance according to a stress bias and a time.

17 Claims, 7 Drawing Sheets

DISPLAY DEVICE AND LUMINANCE DIFFERENCE COMPENSATING METHOD OF THE SAME

CROSS-REFERENCE TO RELATED APPLICATIONS

This application claims the priority of Korean Patent Application No. 10-2023-0183130 filed on Dec. 15, 2023, in the Korean Intellectual Property Office, the disclosure of which is incorporated herein by reference.

BACKGROUND

Technical Field

The present disclosure relates to a display device and a luminance difference compensating method of the same.

Description of the Related Art

An applicable range of the display device is diversified to personal digital assistants as well as monitors of computers and televisions and a display device with a large display area and a reduced volume and weight is being studied.

In the meantime, various types of display elements are used for the display device and in recent years, a light emitting diode (LED) or a micro LED (micro light-emitting diode) which is formed of an inorganic material to have a high reliability and excellent luminous efficiency is being used. Further, a pixel circuit which drives the LED is configured by a pulse amplitude modulation (PAM) which expresses a gray scale level with an amplitude of a driving current and/or a pulse width modulation (PWM) which expresses a gray scale level with a pulse width of a driving current.

BRIEF SUMMARY

The disclosure is directed to a display device which simplifies a threshold voltage difference sensing and compensating of a sub pixel and a luminance difference compensating of the a sub pixel. The present disclosure provides a display device and a luminance difference compensating method of a display device which are capable of reducing a luminance difference of a plurality of sub pixels.

The present disclosure provides a display device and a luminance difference compensating method of a display device which compensate for a threshold voltage of driving transistors of a PAM circuit and a PWM circuit using an external compensating method.

The present disclosure provides a display device and a luminance difference compensating method of a display device which simultaneously sense threshold voltages of a driving transistor of a PAM circuit and of a driving transistor of a PWM circuit to reduce a length of a sensing period.

The present disclosure provides a display device and a luminance difference compensating method of a display device which simultaneously sense threshold voltages of a driving transistor of a PAM circuit and of a driving transistor of a PWM circuit to use only one sensing transistor.

The present disclosure provides a display device and a luminance difference compensating method of a display device which simplify a structure of a sensing unit which senses threshold voltages of a driving transistor of a PAM circuit and of a driving transistor of a PWM circuit.

The present disclosure provides a display device and a luminance difference compensating method of a display device which additionally correct prediction information for a threshold voltage variance of a first driving transistor to more exactly calculate a second threshold voltage variance of a second driving transistor.

The present disclosure provides a display device and a luminance difference compensating method of a display device which calculate a degradation level and a second threshold voltage variance of a second driving transistor based on an image displayed on the display device and a first threshold voltage variance of a first driving transistor.

The present disclosure provides a display device and a luminance difference compensating method of a display device which simplify a threshold voltage difference sensing method and a configuration of a sensing unit to reduce the number of wiring lines and transistors.

Technical characteristics and features of the present disclosure are not limited to the above-mentioned objects, and other objects, which are not mentioned above, can be clearly understood by those skilled in the art from the following descriptions.

According to an aspect of the present disclosure, a display device includes a display panel which includes a plurality of sub pixels; a data driver connected to the display panel; a first circuit unit which is disposed in each of the plurality of sub pixels and includes a first driving transistor; a second circuit unit which is disposed in each of the plurality of sub pixels and includes a second driving transistor; and a sensing transistor which is connected to a drain electrode of the first driving transistor and a source electrode of the second driving transistor, the plurality of sub pixels is driven in the order of an emission period and a sensing period and the sensing transistor simultaneously transmits a first sensing voltage of the drain electrode of the first driving transistor and a second sensing voltage of the source electrode of the second driving transistor to the data driver for the sensing period. Accordingly, one sensing transistor is connected to the first and second driving transistors and the threshold voltages of the first and second driving transistors are simultaneously sensed to shorten the length of the sensing period and simplify the structure of the sensing transistor.

According to an aspect of the present disclosure, a luminance difference compensating method of a display device includes measuring a sensing voltage variance at a node between a drain electrode of a first driving transistor and a source electrode of a second driving transistor of a sub pixel; calculating a first threshold voltage variance of the first driving transistor from the sensing voltage variance; calculating a second threshold voltage variance of the second driving transistor from the first threshold voltage variance and a prediction information; compensating for a first data voltage based on the first threshold voltage variance to apply the compensated first data voltage to the first driving transistor; and compensating for a second data voltage based on the second threshold voltage variance to apply the compensated second data voltage to the second driving transistor, and the prediction information is a difference value of the first threshold voltage variance and the second threshold voltage variance according to a stress bias and a time. Accordingly, the threshold voltage difference of the second driving transistor may be more exactly compensated using both the prediction information of the difference value of the first threshold voltage variance and the second threshold voltage variance.

According to another aspect of the present disclosure, a display device includes: a display panel in which a plurality of sub pixels is defined, and each of the plurality of sub pixels includes: a first circuit unit including a first driving transistor; a second circuit unit which includes a second driving transistor and is connected to the first circuit unit; and a sensing transistor connected to the first circuit unit and the second circuit unit, the sensing transistor is connected to both the first driving transistor and the second driving transistor.

Other detailed matters of the example embodiments are included in the detailed description and the drawings.

According to an embodiment of the present disclosure, a luminance difference between a plurality of sub pixels is reduced.

According to an embodiment of the present disclosure, threshold voltages of driving transistors of the PAM circuit and the PWM circuit may be compensated by an external compensating method.

According to an embodiment of the present disclosure, threshold voltages of the driving transistor of the PAM circuit and the driving transistor of the PWM circuit are simultaneously sensed to reduce the length of the sensing period.

According to an embodiment of the present disclosure, threshold voltages of the driving transistor of the PAM circuit and the driving transistor of the PWM circuit are simultaneously sensed to use only one sensing transistor.

According to an embodiment of the present disclosure, a structure of a sensing unit which senses threshold voltages of the driving transistor of the PAM circuit and the driving transistor of the PWM circuit is simplified.

According to an embodiment of the present disclosure, prediction information is additionally corrected for the first threshold voltage variance of the first driving transistor to more exactly calculate the second threshold voltage variance of the second driving transistor.

According to an embodiment of the present disclosure, an image displayed on the display device is analyzed to predict a degradation level of the driving transistor and compensate for a threshold voltage difference of the driving transistor.

According to an embodiment of the present disclosure, a threshold voltage difference sensing method and a configuration of a sensing unit are simplified to reduce the number of wiring lines and transistors.

The effects according to an embodiment of the present disclosure are not limited to the contents exemplified above, and more various effects are included in the present specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
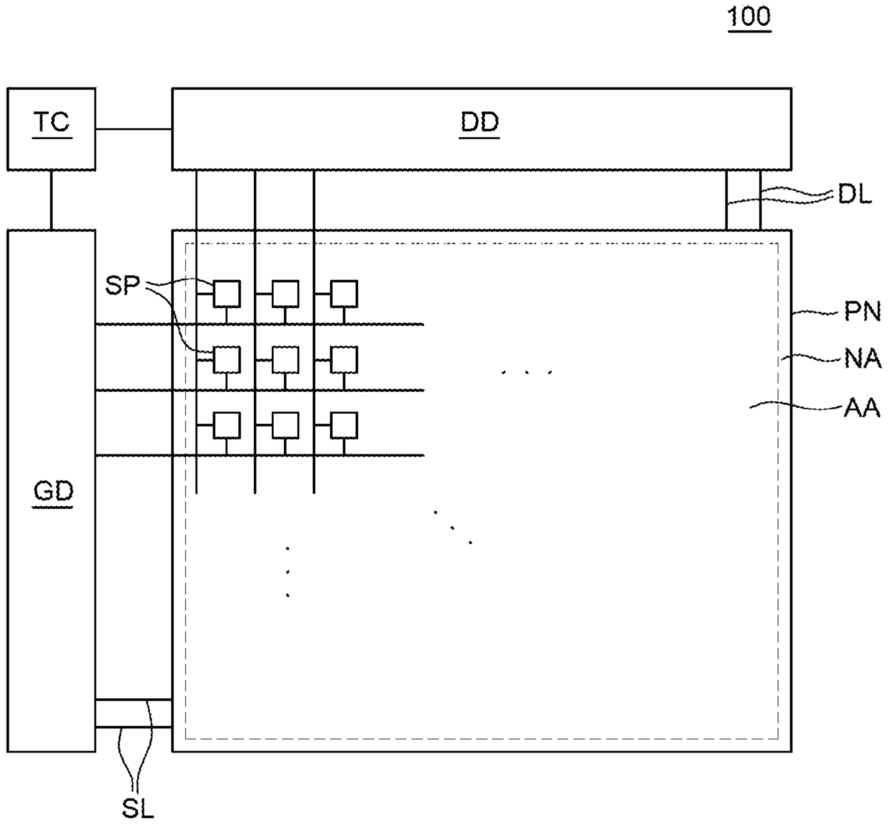
FIG. 1 is a schematic diagram of a display device according to an example embodiment of the present disclosure.

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly."

When an element or layer is disposed "on" another element or layer, another layer or another element may be interposed directly on the other element or therebetween.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, an example embodiments of the present disclosure will be described in detail with reference to accompanying drawings.

FIG. 1 is a schematic diagram of a display device according to an example embodiment of the present disclosure. In FIG. 1, for the convenience of description, among various components of the display device 100, only a display panel PN, a gate driver GD, a data driver DD, and a timing controller TC are illustrated.

Referring to FIG. 1, the display device 100 includes a display panel PN including a plurality of sub pixels SP, a gate driver GD and a data driver DD which supply various signals to the display panel PN, and a timing controller TC which controls the gate driver GD and the data driver DD.

The gate driver GD supplies a plurality of scan signals to a plurality of scan lines SL according to a plurality of gate control signals supplied from the timing controller TC. Even though in FIG. 1, it is illustrated that one gate driver GD is disposed to be spaced apart from one side of the display panel PN, the number of the gate drivers GD and the placement thereof are not limited thereto.

The data driver DD supplies a data voltage to a plurality of data lines DL according to a plurality of data control signals and image data supplied from the timing controller TC. The data driver DD converts the image data into a data voltage using a reference gamma voltage and may supply the converted data voltage to the plurality of data lines DL.

Further, the data driver DD includes a partial configuration of a sensing unit PCS to be described below to output a first data voltage Vdata1 compensated based on a threshold voltage variation ΔVth of each of the plurality of sub pixels SP and a compensated second data voltage Vdata2 to the plurality of sub pixels SP.

The timing controller TC aligns image data input from the outside to supply the image data to the data driver DD. The timing controller TC may generate a gate control signal and a data control signal using synchronization signals input from the outside, such as a dot clock signal, a data enable signal, and horizontal/vertical synchronization signals. Further, the timing controller TC supplies the generated gate control signal and data control signal to the gate driver GD and the data driver DD, respectively, to control the gate driver GD and the data driver DD.

The display panel PN is a configuration which displays images to the user and includes the plurality of sub pixels SP. In the display panel PN, the plurality of scan lines SL and the plurality of data lines DL intersect each other and the plurality of sub pixels SP is formed to intersections of the scan lines SL and the data lines DL.

In the display panel PN, an active area AA and a non-active area NA may be defined.

The active area AA is an area in which images are displayed in the display device 100. In the active area AA, a plurality of sub pixels SP which configures a plurality of pixels and a pixel circuit for driving the plurality of sub pixels SP may be disposed. The plurality of sub pixels SP is a minimum unit which configures the active area AA and n sub pixels SP may form one pixel. In each of the plurality of sub pixels SP, a thin film transistor for driving the plurality of light emitting elements LED may be disposed. The plurality of light emitting elements LED may be defined in different ways depending on the type of the display panel PN. For example, when the display panel PN is an inorganic light emitting display panel PN, the light emitting element LED may be a light emitting diode (LED) or a micro light emitting diode (LED).

In the active area AA, a plurality of signal lines which transmits various signals to the plurality of sub pixels SP is disposed. For example, the plurality of signal lines may include a plurality of data lines DL which supplies a data voltage to each of the plurality of sub pixels SP and a plurality of scan lines which supplies a scan signal to each of the plurality of sub pixels SP. The plurality of scan lines SL extends to one direction in the active area AA to be connected to the plurality of sub pixels SP and the plurality of data lines DL extends to a direction different from the one direction in the active area AA to be connected to the plurality of sub pixels SP. In addition, in the active area AA, a power line may be further disposed, but the present disclosure is not limited thereto.

The non-active area NA is an area where images are not displayed so that the non-active area NA may be defined as an area extending from the active area AA. In the non-active area NA, a link line which transmits a signal to the sub pixel SP of the active area AA, a pad electrode, or a driving IC, such as a gate driver IC or a data driver IC, may be disposed.

In the meantime, the non-active area NA may be located on a rear surface of the display panel PN, that is, a surface on which the sub pixels SP are not disposed or may be omitted, and is not limited as illustrated in the drawing.

In the meantime, a driver, such as a gate driver GD, a data driver DD, and a timing controller TC, may be connected to the display panel PN in various ways. For example, the gate driver GD may be mounted in the non-active area NA in a gate in panel (GIP) manner or mounted between the plurality of sub pixels SP in the active area AA in a gate in active area (GIA) manner.

For example, the data driver DD and the timing controller TC are formed in separate flexible film and printed circuit board and the display panel PN may be electrically connected to the data driver DD and the timing controller TC by bonding the flexible film and the printed circuit board 110 to the pad electrode formed in the non-active area NA of the display panel PN.

As another example, when the gate driver GD is mounted in the active area AA in the GIA manner and a side line which connects the signal line on the front surface of the display panel PN to the pad electrode on a rear surface of the display panel PN is formed to bond the flexible film and the printed circuit board onto a rear surface of the display panel PN, the non-active area NA may be minimized on the front surface of the display panel PN. Therefore, when the gate driver GD, the data driver DD, and the timing controller TC are connected to the display panel PN as described above, a zero bezel with substantially no bezel may be implemented.

Hereinafter, a plurality of sub pixels SP will be described in more detail with reference to FIGS. 2A and 2B.

Figure 2A:
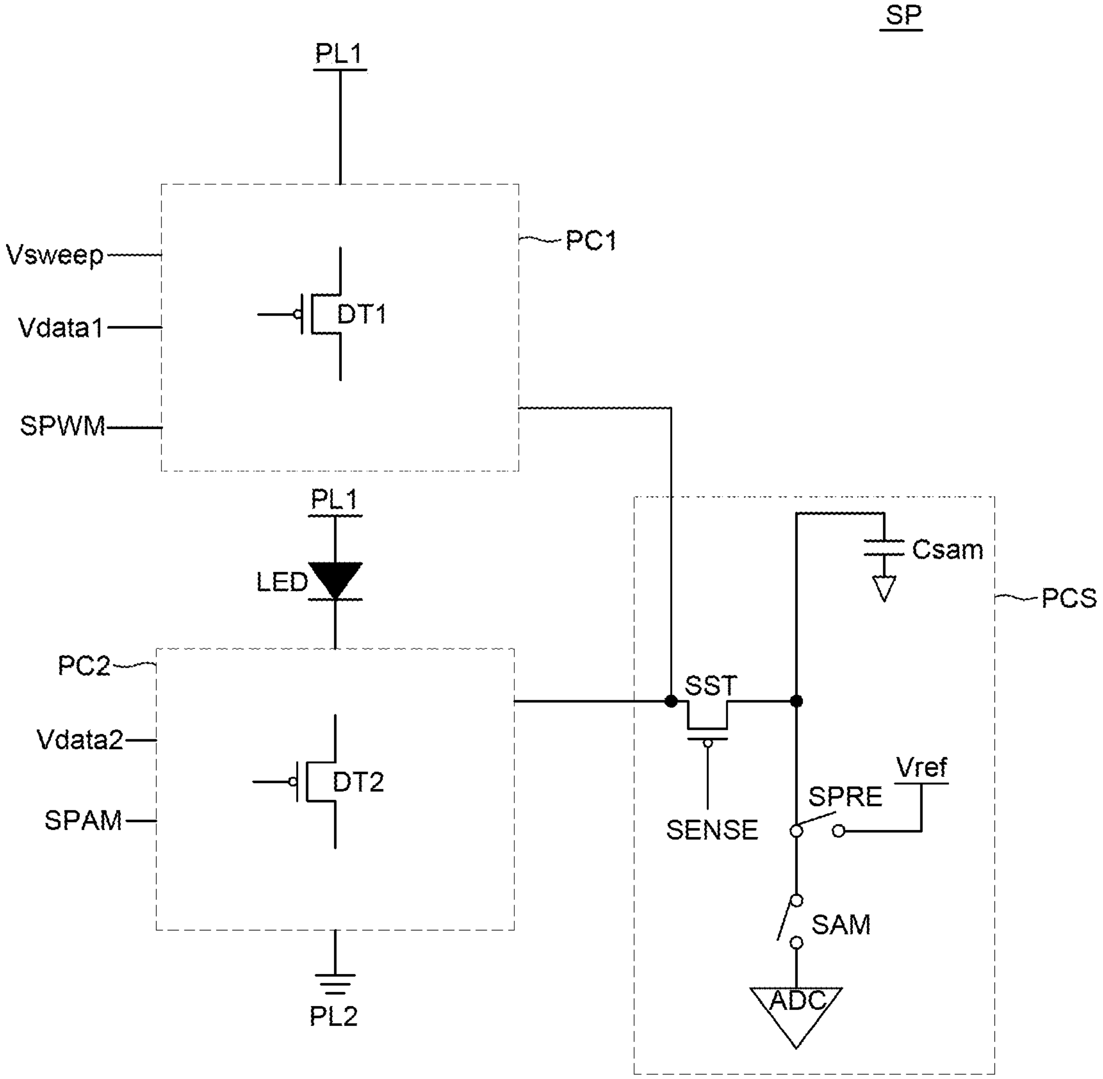
FIG. 2A is a schematic diagram of a sub pixel of a display device according to an example embodiment of the present disclosure.

FIG. 2A is a schematic diagram of a sub pixel of a display device according to an example embodiment of the present disclosure. FIG. 2B is an example circuit diagram of a sub pixel of a display device according to an example embodiment of the present disclosure.

Referring to FIG. 2A, the sub pixel SP includes a light emitting diode LED, a first circuit unit PC1 and a second circuit unit PC2 for driving the light emitting diode LED, and a sensing transistor SST. The sensing transistor SST senses a threshold voltage difference of a first driving transistor DT1 of the first circuit unit PC1 and a second driving transistor DT2 of the second circuit unit PC2.

For example, the first circuit unit PC1 may be a pulse width modulation (PWM) circuit. The first circuit unit PC1 which is the PWM circuit is a circuit which displays images with various gray scale levels by adjusting a pulse width of a driving current. The first circuit unit PC1 including the first driving transistor DT1 may adjust a pulse width of a driving current to be supplied to the light emitting diode LED, based on a sweep signal Vsweep, a first data voltage Vdata1, and a first scan signal SPWM. The first circuit unit PC1 may adjust the pulse width of the driving current according to the gray scale level of the image to be different to adjust an emission period and a gray scale level of the light emitting diode LED. At this time, the pulse width may be expressed by a duty ratio of a driving current or a duration of the driving current. For example, when an image with a low gray scale level is displayed, the first circuit unit PC1 shortens a pulse width of the driving current, for example, shortens the duty ratio of the driving current or the duration of outputting the driving current to reduce the emission period of the light emitting diode LED to display the image with a low gray scale. For example, when an image with a high gray scale level is displayed, the first circuit unit PC1 increases a pulse width of the driving current, for example, increases the duty ratio of the driving current or the duration of outputting the driving current to increase the emission period of the light emitting diode LED to display the image with a high gray scale.

The second circuit unit PC2 may be a pulse amplitude modulation (PAM) circuit. The second circuit unit PC2 which is the PAM circuit is a circuit which displays images with various gray scale levels by adjusting an amplitude of a driving current. The second circuit unit PC2 including the second driving transistor DT2 may adjust an amplitude of a driving current to be supplied to the light emitting diode LED, based on a second data voltage Vdata2 and a second scan signal SPAM. The second circuit unit PC2 adjusts the amplitude of the driving current, that is, an intensity of the driving current according to the gray scale level of the image to be different to adjust an emission period and a gray scale level of the light emitting diode LED. For example, when an image with a low gray scale level is displayed, the second circuit unit PC2 reduces the intensity of the driving current to lower a luminance of light emitted from the light emitting diode LED and display an image with a low gray scale. In contrast, when an image with a high gray scale level is displayed, the second circuit unit PC2 increases the intensity of the driving current to increase a luminance of light emitted from the light emitting diode LED and display an image with a high gray scale.

The light emitting diode LED is connected to any one of the first circuit unit PC1 and the second circuit unit PC2 to be supplied with the driving current. The first circuit unit PC1 and the second circuit unit PC2 adjust an amplitude and a pulse width of the driving current according to an image to be displayed and the light emitting diode LED is supplied with a driving current from the first circuit unit PC1 and the second circuit unit PC2 to emit light. Even though in FIG. 2A, it is illustrated that the light emitting diode LED is connected between the second circuit unit PC2 and a first power line PL1, the light emitting diode LED may be connected to the first circuit unit PC1 or connected between the second circuit unit PC2 and a second power line PL2. However, the present disclosure is not limited thereto.

Further, the sensing transistor SST of each of the plurality of sub pixels SP may be connected to a first switch SPRE, a second switch SAM, a sampling capacitor Csam, and an analog-digital converter ADC. At least some of the first switch SPRE, the second switch SAM, the sampling capacitor Csam, and the analog-digital converter ADC may be a configuration disposed in the data driver DD. For example, the first switch SPRE, the second switch SAM, the sampling capacitor Csam, and the analog-digital converter ADC are disposed in the data driver DD and may be connected to each of the plurality of sub pixels SP. As another example, at least one of the first switch SPRE, the second switch SAM, and the sampling capacitor Csam is disposed with the sub pixel SP in the display panel PN and the remaining configuration may be disposed in the data driver DD together with the analog-digital converter ADC.

The sensing transistor SST of the sub pixel SP and the first switch SPRE, the second switch SAM, the sampling capacitor Csam, and the analog-digital converter ADC are configurations for sensing the threshold voltage variance ΔVth of the first driving transistor DT1 and the second driving transistor DT2 to compensate for the threshold voltage difference of the plurality of sub pixels SP. Therefore, the sensing transistor SST, the first switch SPRE, the second switch SAM, the sampling capacitor Csam, and the analog-digital converter ADC may be defined as a sensing unit PCS. Hereinafter, it is described by defining the sensing transistor SST, the first switch SPRE, the second switch SAM, the sampling capacitor Csam, and the analog-digital converter ADC as a sensing unit PCS, but it is not limited thereto.

In the meantime, the first circuit unit PC1 including the first driving transistor DT1 includes at least one or more transistors and a capacitor in addition to the first driving transistor DT1 to control a pulse width of the driving current. Further, the second circuit unit PC2 including the second driving transistor DT2 includes at least one or more transistors and a capacitor in addition to the second driving transistor DT2 to control an amplitude of the driving current.

Hereinafter, referring to FIG. 2B, an example circuit configuration of the first circuit unit PC1 and the second circuit unit PC2 of the sub pixel SP will be described with reference to FIG. 2B.

Figure 2B:
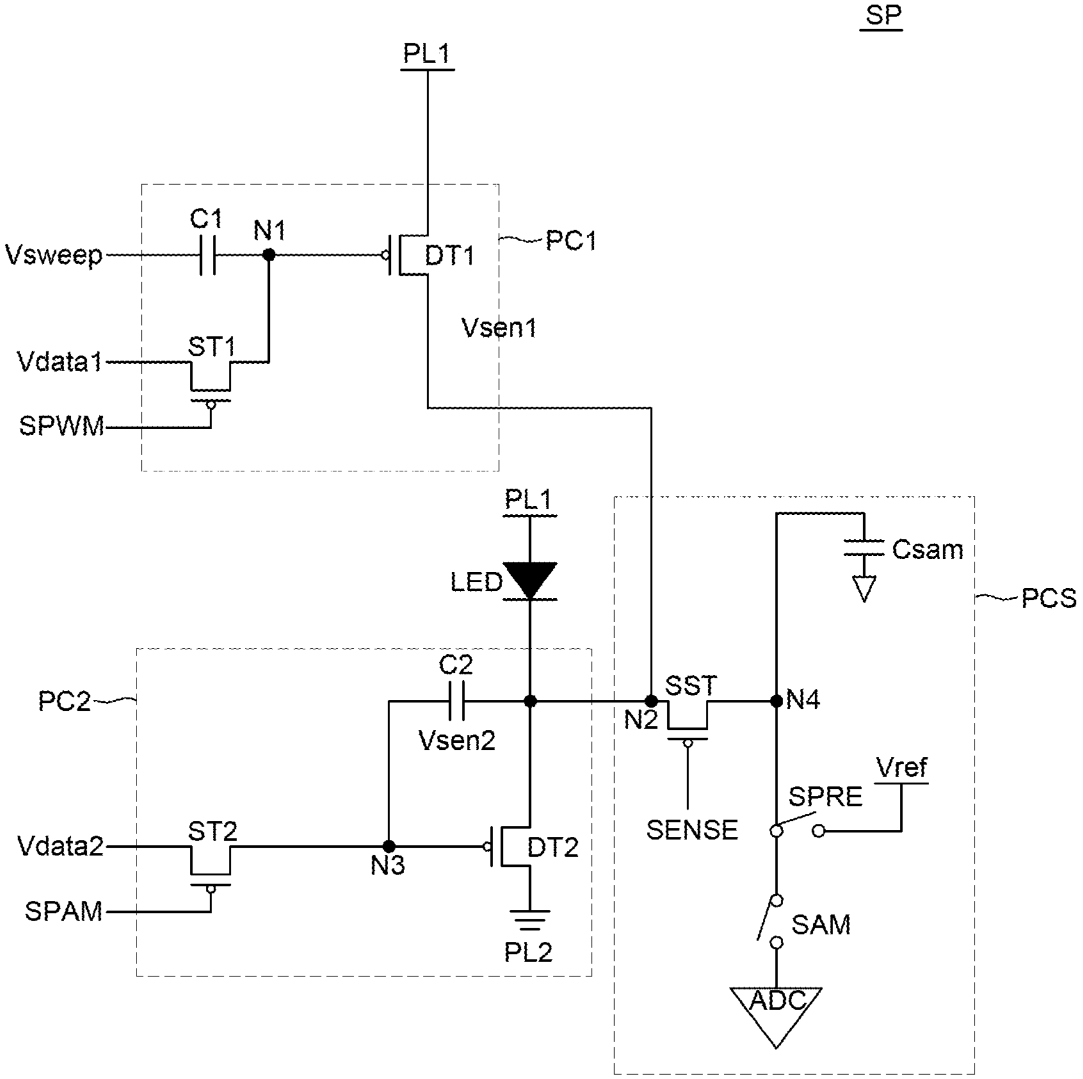
FIG. 2B is an example circuit diagram of a sub pixel of a display device according to an example embodiment of the present disclosure.

Referring to FIG. 2B, the first circuit unit PC1 may include a first driving transistor DT1, a first switching transistor ST1, and a first capacitor C1.

The first switching transistor ST1 of the first circuit unit PC1 is a transistor which is turned on by the first scan signal SPWM to transmit the first data voltage Vdata1 to the first driving transistor DT1. A gate electrode of the first switching transistor ST1 is connected to a first scan line, a source electrode is connected to a first data line, and a drain electrode is connected to a gate electrode of the first driving transistor DT1 which is a first node N1. The first switching transistor ST1 is turned on by the first scan signal SPWM to transmit the first data voltage Vdata1 to the gate electrode of the first driving transistor DT1.

The first driving transistor DT1 of the first circuit unit PC1 is a transistor which controls a duty ratio or an output time of a driving current based on the first data voltage Vdata1 transmitted from the first switching transistor ST1. The gate electrode of the first driving transistor DT1 is connected to the first node N2, a source electrode is connected to the first power line PL1, and a drain electrode is connected to the second node N2. The driving current from the first driving transistor DT1 may be transmitted to the second circuit unit PC2.

The first capacitor C1 of the first circuit unit PC1 is a capacitor which transmits a sweep signal Vsweep of the sweep line to the first node N1. The first capacitor C1 includes a plurality of capacitor electrodes and some capacitor electrode is connected to the sweep line and the remaining capacitor electrode is connected to the gate electrode of the first driving transistor DT1 which is the first node N1. The sweep signal Vsweep of the sweep line is a voltage which linearly changes. When the sweep signal Vsweep is applied to one end of the first capacitor C1, a coupling voltage may generate in the gate electrode of the first driving transistor DT1. Accordingly, the voltage of the gate electrode of the first driving transistor DT1 is coupled to the sweep signal Vsweep to be decreased or increased and the first driving transistor DT1 may be turned on or turned off.

The second circuit unit PC2 may include a second driving transistor DT2, a second switching transistor ST2, and a second capacitor C2.

The second switching transistor ST2 of the second circuit unit PC2 is a transistor which is turned on by the second scan signal SPAM to transmit the second data voltage Vdata2 to the second driving transistor DT2. A gate electrode of the second switching transistor ST2 is connected to a second scan line, a source electrode is connected to a second data line, and a drain electrode is connected to a gate electrode of the second driving transistor DT2 and the third node N3. The second switching transistor ST2 is turned on by the second scan signal SPAM to transmit the second data voltage Vdata2 to the gate electrode of the second driving transistor DT2.

The second driving transistor DT2 of the second circuit unit PC2 is a transistor which controls an intensity of the driving current based on the second data voltage Vdata2 transmitted from the second switching transistor ST2. The gate electrode of the second driving transistor DT2 is connected to the third node N3, a source electrode is connected to the light emitting diode LED and the second node N2, and a drain electrode is connected to the second power line PL2. The second driving transistor DT2 is turned on to supply the driving current to the light emitting diode LED.

The second capacitor C2 of the second circuit unit PC2 maintains a potential difference between the gate electrode and the source electrode of the second driving transistor DT2 while the light emitting diode LED emits light to supply a constant driving current to the light emitting diode LED. The second capacitor C2 includes a plurality of capacitor electrodes and some capacitor electrode is connected to the source electrode of the second driving transistor DT2, the second node N2, and the light emitting diode LED. The remaining capacitor electrode is connected to the gate electrode of the second driving transistor DT2 and the third node N3.

The sensing unit PCS is a compensation unit which senses threshold voltages of the first driving transistor DT1 of the first circuit unit PC1 and the second driving transistor DT2 of the second circuit unit PC2 to compensate for a luminance difference between the plurality of sub pixels SP. The sensing unit PCS may sense a threshold voltage variance ΔVth of the first driving transistor DT1 and the second driving transistor DT2. The data driver DD may compensate for the first data voltage Vdata1 and the second data voltage Vdata2 which are applied to the first circuit unit PC1 and the second circuit unit PC2, respectively, based on a sensing result.

The sensing transistor SST is a transistor which senses the threshold voltages of the first driving transistor DT1 and the second driving transistor DT2 to compensate for the threshold difference of the first driving transistor DT1 and the second driving transistor DT2 of each of the plurality of sub pixels SP. A gate electrode of the sensing transistor SST is connected to a sensing line, a source electrode is connected to the second node N3, and a drain electrode is connected to the fourth node N4. The sensing transistor SST is turned on by the sensing signal SENSE from the sensing line to electrically connect a reference line or the analog-digital converter ADC to the second node N2.

The first switch SPRE is a switch which connects the sensing transistor SST and the reference line. The first switch SPRE may be disposed between the fourth node N4 and the reference line. In the beginning part of the sensing period, the sensing transistor SST and the reference line may be connected by the first switch SPRE and the second node N2 may be initialized to the reference voltage Vref.

The second switch SAM is a switch which connects the sensing transistor SST and the analog-digital converter ADC. The second switch SAM may be disposed between the fourth node N4 and the analog-digital converter. In the latter part of the sensing period, the second switch SAM may connect the sensing transistor SST and the analog-digital converter ADC and may transmit the sensing voltage Vsen to the analog-digital converter ADC.

The analog-digital converter ADC is a configuration which senses the sensing voltage Vsen to calculate the threshold voltage variance ΔVth. The analog-digital converter ADC may convert an analog sensing voltage Vsen into digital data. Therefore, the data driver DD calculates the threshold voltage variance ΔVth based on the digital data and may generate compensation data to compensate for the threshold voltage difference.

The sampling capacitor Csam may be charged by a voltage of the fourth node N4, e.g., a voltage of the second node N2 which is transmitted to the fourth node N4 through the sensing transistor SST. When the second switch SAM is turned on to connect the analog-digital converter ADC and the fourth node N4, the analog-digital converter ADC may convert a voltage stored in the sampling capacitor Csam into a digital signal.

Next, the light emitting diode LED is connected between the first power line PL1 and the second circuit unit PC2. The light emitting diode LED may use various elements depending on a type of the display device 100, and for example, may be a micro light emitting diode (LED). The light emitting diode LED includes an anode and a cathode. The anode of the light emitting diode LED is connected to the first power line PL1 and the cathode is connected to the source electrode of the second driving transistor DT2 of the second circuit unit PC2. The light emitting diode LED may emit light based on a driving current which flows from the first power line PL1 to the second driving transistor DT2 and the second power line PL2.

The first power line PL1 is a wiring line which supplies a high potential power voltage VDD and a low potential power voltage VSS to the sub pixel SP and the second power line PL2 is a wiring line which supplies a low potential power voltage VSS to the sub pixel SP. The first power line PL1 supplies the low potential power voltage VSS to the sub pixel SP during the sensing period and may supply the high potential power voltage VDD to the sub pixel during the remaining period excluding the sensing period. The second power line PL2 may always supply the low potential power voltage VSS to the sub pixel SP regardless of the sensing period.

In the meantime, in some implementations, the threshold voltage differences of the first driving transistor and the second driving transistor are sequentially sensed. A sensing transistor for detecting a first threshold voltage variance of the first driving transistor and a sensing transistor for detecting a second threshold voltage variance of the second driving transistor are separately provided. Further, a period for detecting the first threshold voltage variance and a period for detecting the second threshold voltage variance are set to be different timings to detect the threshold voltage variance. Therefore, the threshold voltage variances of the first driving transistor and the second driving transistor are sensed in different periods so that the sensing period is increased and two or more sensing transistors are performed. However, there are problems in that it is difficult to ensure a sufficient sensing period for one frame and a structure of a display device for placing a plurality of sensing transistors is complex.

In the display device 100 according to the example embodiment of the present disclosure, the sensing unit PCS includes only one sensing transistor SST. One sensing transistor may simultaneously sense the threshold voltage variance ΔVth of the first driving transistor DT1 and the threshold voltage variance ΔVth of the second driving transistor DT2. Further, the data driver DD may compensate for the threshold voltage difference of the first driving transistor DT1 and the second driving transistor DT2 based on the sensing result and prediction information of a threshold voltage variance ΔVth stored in a memory. Therefore, a length of the sensing period in one frame is shortened and the sensing process may be simplified. Accordingly, in the display device 100 according to the example embodiment of the present disclosure, a threshold voltage difference of each of the plurality of sub pixels is compensated based on the threshold voltage variance ΔVth of the driving transistor and prediction information. Further, the luminance difference between the plurality of sub pixels SP of the display device 100 may be reduced.

Hereinafter, a luminance difference compensating method of the display device 100 according to the example embodiment of the present disclosure will be described with reference to FIGS. 3 to 6.

Figure 3:
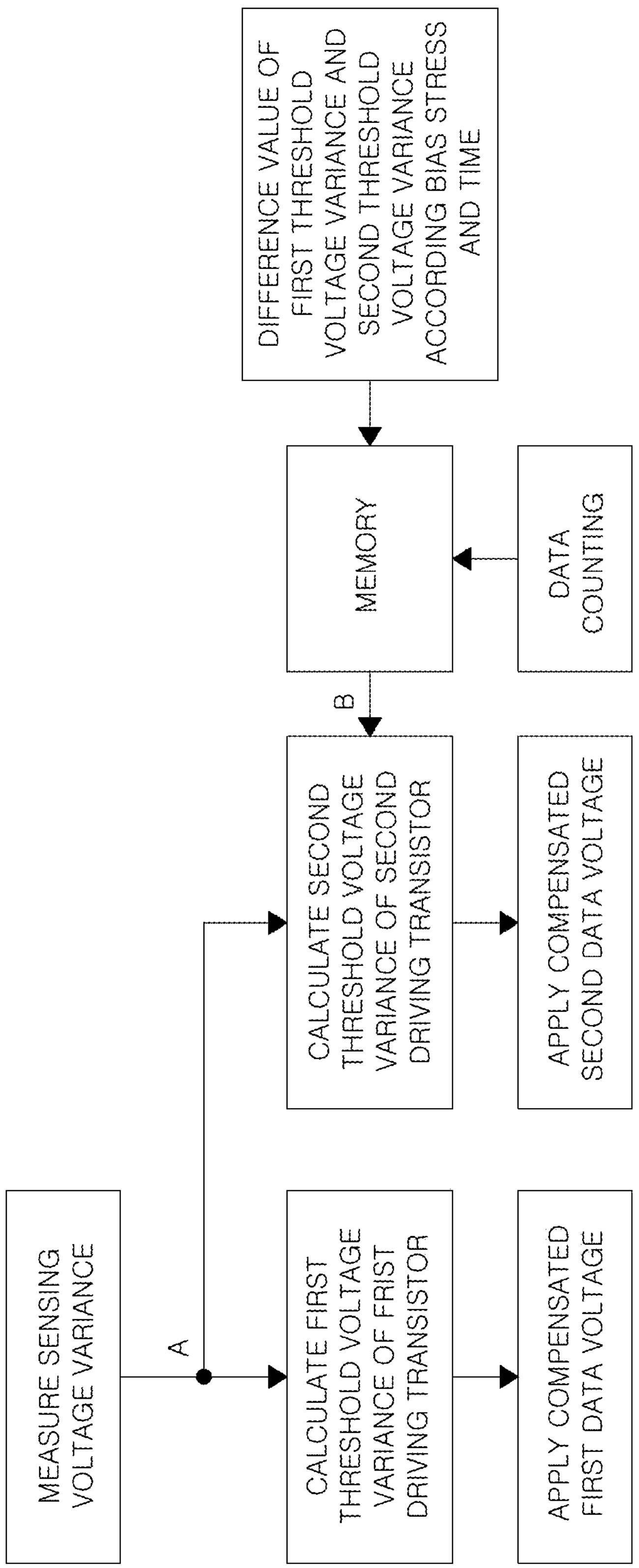
FIG. 3 is a flowchart for explaining a luminance difference compensating method of a display device according to an example embodiment of the present disclosure.
Figure 4:
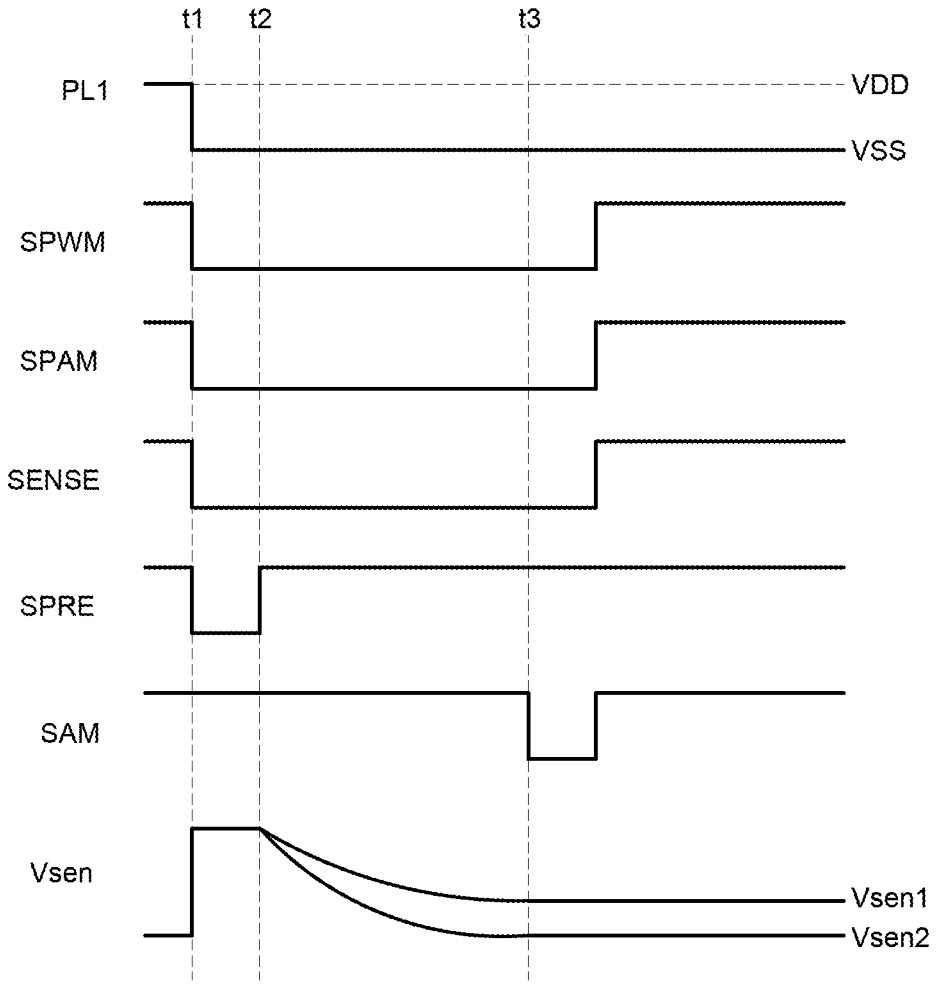
FIG. 4 is a driving timing diagram of a sub pixel for a sensing period of a display device according to an example embodiment of the present disclosure.
Figure 5:
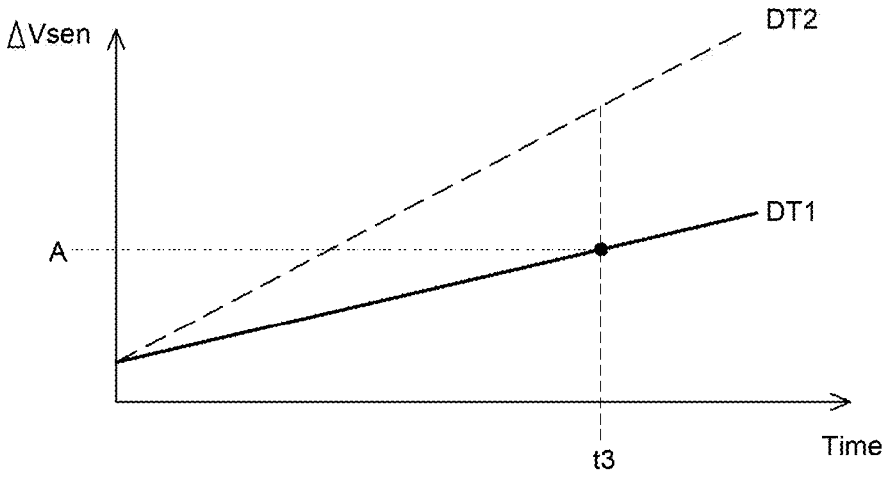
FIG. 5 is a graph illustrating a sensing voltage variance of a driving transistor according to a time, of a display device according to an example embodiment of the present disclosure.
Figure 6:
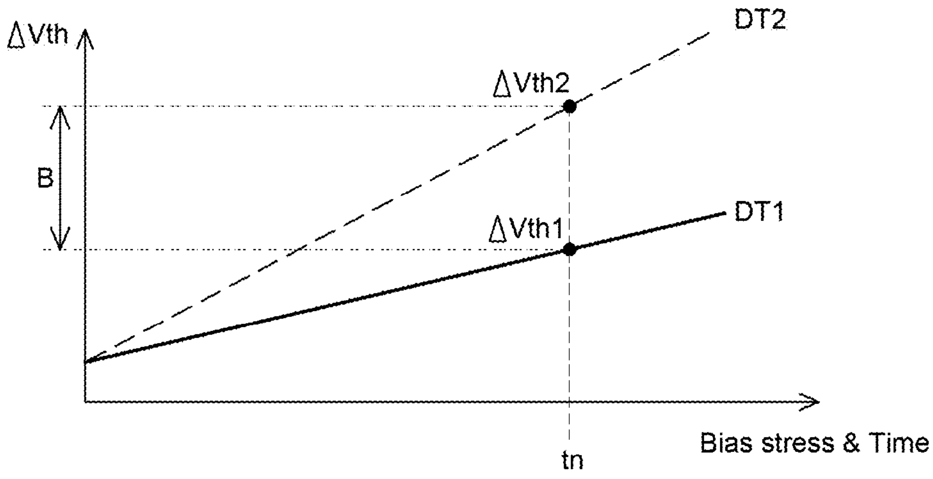
FIG. 6 is a graph illustrating a threshold voltage variance of a driving transistor according to a bias stress and a time, of a display device according to an example embodiment of the present disclosure.

FIG. 3 is a flowchart for explaining a luminance difference compensating method of a display device according to an example embodiment of the present disclosure. FIG. 4 is a driving timing diagram of a sub pixel for a sensing period of a display device according to an example embodiment of the present disclosure. FIG. 5 is a graph illustrating a sensing voltage variance of a driving transistor according to a time, of a display device according to an example embodiment of the present disclosure. FIG. 6 is a graph illustrating a threshold voltage variance of a driving transistor according to a bias stress and a time, of a display device according to an example embodiment of the present disclosure.

Referring to FIGS. 3 and 5, a sensing voltage variance ΔVsen is measured using the sensing unit PCS. A voltage of the second node N2 during the sensing period, that is, a sensing voltage Vsen may be detected using the sensing unit PCS. The sensing voltage Vsen is a voltage to which threshold voltages of the first driving transistor DT1 and the second driving transistor DT2 are reflected and a threshold voltage may be detected from a difference between the sensing voltage Vsen and the reference voltage Vref.

Hereinafter, a threshold voltage of the first driving transistor DT1 will be referred to as a first threshold voltage and a threshold voltage of the second driving transistor DT2 will be referred to as a second threshold voltage.

Referring to FIGS. 2B and 4 together, a low potential power voltage VSS is output from the first power line PL1 during the sensing period. Therefore, the light emitting diode LED having an anode which is connected to the first power line PL1 does not emit light during the sensing period. Further, the threshold voltage change of the first driving transistor DT1 may be sensed by flowing current from the second node N2 to the first power line PL1 via the first driving transistor DT1.

First, at a first time t1 of the sensing period, a turn-on level of the first scan signal SPMW and the second scan signal SPAM are applied to the sub pixel SP. The first switching transistor ST1 may be turned on by the first scan signal SPWM and a first data voltage Vdata1 for sensing may be applied to the gate electrode of the first driving transistor DT1 by means of the first switching transistor ST1. Further, the second switching transistor ST2 may be turned on by the second scan signal SPAM. A second data voltage Vdata2 for sensing may be applied to the gate electrode of the second driving transistor DT2 by means of the second switching transistor ST2. Accordingly, at the first time t1, the data voltage Vdata1 and Vdata2 for sensing are applied to the gate electrode of the first driving transistor DT1 and the gate electrode of the second driving transistor DT2 to turn on the first driving transistor DT1 and the second driving transistor DT2.

The turn-on level of sensing voltage Vsen is applied to the sub pixel SP through a sensing line at the first time t1. Therefore, the sensing transistor SST may maintain a turned-on state by the sensing voltage Vsen applied to the gate electrode during the sensing period.

Further, at the first time t1, the first switch SPRE is turned on to supply the reference voltage Vref to the fourth node N4. Therefore, the reference voltage Vref may be charged in the second node N2 from the reference line by means of the turned-on first switch SPRE and sensing transistor SST. Accordingly, a voltage of the drain electrode of the first driving transistor DT1 and the source electrode of the second driving transistor DT2 may be set to as the reference voltage Vref.

Therefore, a current flows from the first driving transistor DT1 to the first power line PL1 by the first data voltage Vdata1 for sensing applied to the gate electrode of the first driving transistor DT1 and the reference voltage Vref applied at the drain electrode at the first time t1. Likewise, a current may flow from the second driving transistor DT2 to the second power line PL2 by the second data voltage Vdata2 for sensing applied to the gate electrode of the second driving transistor DT2 and the reference voltage Vref applied at the source electrode at the first time t1.

Next, the first switch SPRE is turned off at the second time t2 to float the second node N2. Further, the current flows form the second node N2 to the first driving transistor DT1 and the first power line PL1 and the current flows to the second driving transistor DT2 and the second power line PL2 so that the voltage of the second node N2 may be decreased.

The current which flows through the first driving transistor DT1 may flow until a voltage difference of the gate electrode and the drain electrode of the first driving transistor DT1 becomes a first threshold voltage. The current flows through the first driving transistor DT1 so that the voltage of the drain electrode may be reduced. When the difference of the voltage of the drain electrode and the first data voltage Vdata1 for sensing of the gate electrode is the first threshold voltage, the first driving transistor DT1 is turned off so that the current does not flow and the voltage of the drain electrode may converge to the first sensing voltage Vsen1.

The current which flows through the second driving transistor DT2 may flow until a voltage difference of the gate electrode and the drain electrode of the second driving transistor DT2 becomes a second threshold voltage. The current flows through the second driving transistor DT2 so that the voltage of the source electrode may be reduced. When the difference of the voltage of the source electrode and the second data voltage Vdata2 for sensing of the gate electrode becomes the second threshold voltage, the second driving transistor DT2 is turned off so that the current does not flow and the voltage of the source electrode may converge to the second sensing voltage Vsen2.

At this time, a voltage of the second node N2 which is connected to both the drain electrode of the first driving transistor DT1 and the source electrode of the second driving transistor DT2 may be a relatively higher one of the first sensing voltage Vsen1 and the second sensing voltage Vsen2. Further, the first sensing voltage Vsen1 from the first driving transistor DT1 which has a relatively low threshold voltage variance ΔVth may have a higher value than that of the second sensing voltage Vsen2.

For example, the second driving transistor DT2 among the first driving transistor DT1 and the second driving transistor DT2 may supply more driving current to the light emitting diode LED. More current may flow through the second driving transistor DT2 than through the first driving transistor DT1. Therefore, when the display device 100 is driven, a variance of the second threshold voltage of the second driving transistor DT2 through which more current flows will be higher than a variance of the first threshold voltage of the first driving transistor DT1. Therefore, as more current flows from the source electrode of the second driving transistor DT2 to the second power line PL2, the voltage of the source electrode of the second driving transistor DT2 may be reduced more than the voltage of the drain electrode of the first driving transistor DT1. Further, the second sensing voltage Vsen2 may be lower than the first sensing voltage Vsen1. Accordingly, the voltage of the second node N2 may be the first sensing voltage Vsen1 which has a relatively higher value.

Next, the second switch SAM is turned on at a third time t3. When the second switch SAM is turned on, the analog-digital converter ADC may be connected to the sensing transistor SST of the sub pixel SP which is the fourth node N4. At this time, the sensing transistor SST may transmit the first sensing voltage Vsen1 of the second node N2 to the fourth node N4 in the turned-on state. Accordingly, the analog-digital converter ADC detects the first sensing voltage Vsen1 which is transmitted to the fourth node N4 through the sensing transistor SST to finally measure the sensing voltage variance ΔVsen. The sensing voltage variance ΔVsen may be confirmed from a difference between the reference voltage Vref which is initially applied to the second node N2 and the first sensing voltage Vsen1. That is, the initial sensing voltage Vsen is a reference voltage Vref and the sensing voltage Vsen which is measured last is the first sensing voltage Vsen1 so that the difference of the reference voltage Vref and the first sensing voltage Vsen1 may become the sensing voltage variance ΔVsen.

For example, referring to FIG. 5, the first sensing voltage Vsen1 from the first driving transistor DT1 is higher than the second sensing voltage Vsen2 from the second driving transistor DT2. Therefore, a sensing voltage variance ΔVsen for the first driving transistor DT1 may be smaller than a sensing voltage variance ΔVsen for the second driving transistor DT2. Further, at the third time t3 when the second switch SAM is turned on, the analog-digital converter ADC may sense a value A of the sensing voltage variance ΔVsen of the first driving transistor DT1.

Next, referring to FIG. 3, the data driver DD calculates the first threshold voltage variance ΔVth1 of the first driving transistor DT1 from the value A of the sensing voltage variance ΔVsen. The sensing voltage variance ΔVsen is a difference voltage between the reference voltage Vref and the first sensing voltage Vsen1 and the first sensing voltage Vsen1 is a voltage to which the first threshold voltage of the first driving transistor DT1 and the reference voltage Vref are reflected. Therefore, the first threshold voltage variance ΔVth1 may be calculated based on the value A of the sensing voltage variance ΔVsen and the reference voltage Vref.

With the first threshold voltage variance ΔVth1 of the first driving transistor DT1 being calculated from the sensing voltage variance ΔVsen, in the display device 100 according to the example embodiment of the present disclosure, the second threshold voltage variance ΔVth2 may be calculated based on the first threshold voltage variance ΔVth1 and a prediction information stored in the memory.

For example, referring to FIGS. 3 and 6, the second threshold voltage variance ΔVth2 of the second driving transistor DT2 may be calculated from the first threshold voltage variance ΔVth1 of the first driving transistor DT1 calculated from the value A of the sensing voltage variance ΔVsen and the prediction information stored in the memory. The prediction information is information about a difference value of the first threshold voltage variance ΔVth1 and the second threshold voltage variance ΔVth2 according to a bias stress and a time. The first threshold voltage variance ΔVth1 of the first driving transistor DT1 and the second threshold voltage variance ΔVth2 of the second driving transistor DT2 according to the bias stress and the time are calculated from a plurality of samples. Further, difference value information of the first threshold voltage variance ΔVth1 and the second threshold voltage variance ΔVth2 is stored in the memory based on an average value thereof. For example, in the memory, the difference value between the first threshold voltage variance ΔVth1 and the second threshold voltage variance ΔVth2 according to a bias stress and a time may be stored in the memory as a look-up table. Accordingly, the second threshold voltage variance ΔVth2 may be calculated from the prediction information of the second threshold voltage variance ΔVth2 taken based on a bias stress and a time of an image displayed in the display device 100.

The bias stress is a stress which is generated when a voltage is applied to a gate electrode of a transistor. When a voltage is applied to the gate electrode of the first driving transistor DT1 and the gate electrode of the second driving transistor DT2, the first driving transistor DT1 and the second driving transistor DT2 may be deteriorated. Further, a voltage to be applied to the gate electrode of the first driving transistor DT1 and the gate electrode of the second driving transistor DT2 may vary depending on a displayed image, which may vary the bias stress. For example, as the bias stress applied to the gate electrode of the first driving transistor DT1 and the gate electrode of the second driving transistor DT2 is increased, the deterioration of the first driving transistor DT1 and the second driving transistor DT2 is accelerated to increase the threshold voltage variance ΔVth. The more the voltage applied to the gate electrode of the first driving transistor DT1, the more the first threshold voltage variance ΔVth1 of the first driving transistor DT1. Likewise, the more the voltage applied to the gate electrode of the second driving transistor DT2, the more the second threshold voltage variance ΔVth2 of the second driving transistor DT2.

Further, as the time when the bias stress is applied is increased, the deterioration of the first driving transistor DT1 and the second driving transistor DT2 may be accelerated. For example, as compared a case when the voltage is applied to the gate electrode of the first driving transistor DT1 for one hour, when the voltage is applied to the gate electrode of the first driving transistor DT1 for ten hours, the first threshold voltage variance ΔVth1 may be increased.

Accordingly, when a bias stress with a specific voltage is applied, a difference value of the first threshold voltage variance ΔVth1 of the first driving transistor DT1 and the second threshold voltage variance ΔVth2 of the second driving transistor DT2 may be stored as the prediction information according to an applying time of the bias stress. For example, when the display device 100 displays images with 0 to 255 gray scale levels, a voltage applied to the gate electrode at each of the 0 to 255 gray scales and the threshold voltage variance ΔVth according to the voltage applying time are extracted from the plurality of samples. The result is organized as a lookup table to be stored in the memory.

Next, referring to FIG. 3, a difference B of the first threshold voltage variance ΔVth1 and the second threshold voltage variance ΔVth2 to be extracted from the memory by means of data counting is determined. An image displayed on the display device 100 is analyzed by means of the data counting and the data voltage to display the image and the data voltage applying time may be stored in the memory. In order to display a specific image by means of the data counting, after detecting a data voltage applied to the gate electrode of the first driving transistor DT1 and the gate electrode of the second driving transistor DT2 and the applying time of the data voltage, the information may be stored in the memory in advance. The image displayed on the display device 100 is analyzed to calculate a degradation level of the second driving transistor DT2, that is, a prediction value of the second threshold voltage variance ΔVth2.

Next, among differences of the first threshold voltage variance ΔVth1 and the second threshold voltage variance ΔVth2 stored in the memory lookup table, a difference B corresponding to the data voltage which is stored in the memory in advance by means of the data counting and the applying time of the data voltage may be extracted. For example, when image information stored in the memory by means of the data counting applies the first data voltage Vdata1 and the second data voltage Vdata2 of mV for n seconds, if the bias stress of mV is applied for n seconds in the lookup table, the difference B between the first threshold voltage variance ΔVth1 and the second threshold voltage variance ΔVth2 may be extracted. Further, the second threshold voltage variance ΔVth2 of the second driving transistor DT2 may be calculated by adding the difference value B to the first threshold voltage variance ΔVth1 of the first driving transistor DT1 calculated from the value A of the sensing voltage variance ΔVsen.

For example, when the first data voltage Vdata1 and the second data voltage Vdata2 of mV applies mV for n seconds to display the image in the display device 100, the prediction information of the first threshold voltage variance ΔVth1 and the prediction information of the second threshold voltage variance ΔVth2 for the data voltage of mV and the applying time of n seconds may be confirmed from the lookup table. Further, when the data voltage of mV, among prediction information stored in the lookup table, is applied for n seconds, if the first threshold voltage variance ΔVth1 is 1 V and the second threshold voltage variance ΔVth2 is 2 V, the difference value B may be 1 V. That is, it may be confirmed that when the data voltage of mV is applied for one minute, the second threshold voltage variance ΔVth2 is 1 V more than the first threshold voltage variance ΔVth1, from the prediction information. Actually, when the data voltage of mV is applied for n minute to display the image on the display device 100, it may be predicted that the second threshold voltage variance ΔVth2 is IV more than the first threshold voltage variance ΔVth1, from the prediction information. Accordingly, when the difference value B is added to the first threshold voltage variance ΔVth1 calculated from the value A of the sensing voltage variance ΔVsen, the second threshold voltage variance ΔVth2 may be predicted.

Finally, in the next frame, the first data voltage Vdata1 is compensated based on the first threshold voltage variance ΔVth1 and the compensated first data voltage Vdata1 may be applied to the first circuit unit PC1 of the sub pixel SP. Further, in next frame, the second data voltage Vdata2 is compensated based on the second threshold voltage variance ΔVth2 and the compensated second data voltage Vdata2 may be applied to the second circuit unit PC2 of the sub pixel SP. The compensated first data voltage Vdata1 is a voltage for compensating a difference of the first threshold voltage variance ΔVth1 of each of the plurality of sub pixels SP and may vary according to the first threshold voltage variance ΔVth1. For example, a compensated first data voltage Vdata1 which is applied to each of a sub pixel SP with a relatively higher first threshold voltage variance ΔVth1 and a sub pixel SP with a relatively lower first threshold voltage variance ΔVth1 may be different. Further, the compensated second data voltage Vdata2 is a voltage for compensating a difference of the second threshold voltage variance ΔVth2 of each of the plurality of sub pixels SP and may vary according to the second threshold voltage variance ΔVth2. For example, a compensated second data voltage Vdata2 which is applied to each of a sub pixel SP with a relatively higher second threshold voltage variance ΔVth2 and a sub pixel SP with a relatively lower second threshold voltage variance ΔVth2 may be different. Accordingly, the luminance difference according to the first threshold voltage variance ΔVth1 difference and the second threshold voltage variance ΔVth2 difference may be reduced by applying the compensated first data voltage Vdata1 and the compensated second data voltage Vdata2 to each of the plurality of sub pixels SP.

Accordingly, in the display device 100 according to the example embodiment of the present disclosure, the first threshold voltage variance ΔVth1 is calculated first using the sensing unit PCS including one sensing transistor SST. A prediction value of the second threshold voltage variance ΔVth2 is calculated based on the first threshold voltage variance ΔVth1 and the prediction information to reduce the luminance difference between the plurality of sub pixels SP. For example, one sensing transistor SST is connected to the first driving transistor DT1 and the second driving transistor DT2. A sensing voltage variance ΔVsen to which the threshold voltage variance ΔVth of the first driving transistor DT1 and the second driving transistor DT2 are reflected may be detected by means of the sensing transistor SST. At this time, the second driving transistor DT2 transmits relatively more current so that the second sensing voltage Vsen2 for the second driving transistor DT2 is lower than the first sensing voltage Vsen1 for the first driving transistor DT1. Further, the sensing voltage Vsen sensed by the sensing transistor SST may become a first sensing voltage Vsen1 having a relatively higher value. Therefore, a value A of the sensing voltage variance ΔVsen is calculated from the difference value between the first sensing voltage Vsen1 and the reference voltage Vref and the first threshold voltage variance ΔVth1 may be calculated from the value A. Further, the second threshold voltage variance ΔVth2 may derive a prediction value by adding the first threshold voltage variance ΔVth1 to the difference value B of the first threshold voltage variance ΔVth1 and the second threshold voltage variance ΔVth2 according to the stress bias for the displayed image and the time. Therefore, only one sensing transistor SST is disposed in the sub pixel SP and the prediction information for the relative difference value of the first threshold voltage variance ΔVth1 and the second threshold voltage variance ΔVth2 according to the stress bias and the time is stored in the memory in advance. By doing this, both the first threshold voltage variance ΔVth1 and the second threshold voltage variance ΔVth2 may be calculated. Further, the second threshold voltage variance ΔVth2 is calculated from the first threshold voltage variance ΔVth1 so that a sensing period for the first driving transistor DT1 and a sensing period for the second driving transistor DT2 may be integrated to one without being separately set. Accordingly, the structure of the sensing unit PCS is simplified and the sensing period is shortened to increase the compensation power. Further, at least one sensing transistor SST is disposed in the sub pixel SP so that the number of sensing transistors SST and wiring lines for driving the sensing transistors is reduced as a whole. Further, as some wiring line and transistor are deleted so that the plurality of driving transistors may be more easily formed in the sub pixel SP and a high resolution display device 100 may be implemented.

The example embodiments of the present disclosure can also be described as follows:

According to an aspect of the present disclosure, a display panel which includes a plurality of sub pixels, a data driver connected to the display panel, a first circuit unit which is disposed in each of the plurality of sub pixels and includes a first driving transistor, a second circuit unit which is disposed in each of the plurality of sub pixels and includes a second driving transistor, and a sensing transistor which is connected to a drain electrode of the first driving transistor and a source electrode of the second driving transistor, the plurality of sub pixels is driven in the order of an emission period and a sensing period and the sensing transistor simultaneously transmits a first sensing voltage of the drain electrode of the first driving transistor and a second sensing voltage of the source electrode of the second driving transistor to the data driver for the sensing period.

The display device may further include a first power line which is connected to a source electrode of the first driving transistor, and a second power line which is connected to a drain electrode of the second driving transistor, the first power line may supply a low potential power voltage for the sensing period and supply a high potential power voltage for the emission period, and the second power line may supply the low potential power voltage for the sensing period and the emission period.

During the sensing period, a current may flow from the first driving transistor to the first power line and a current may flow from the second driving transistor to the second power line.

The sensing transistor may be connected to the data driver, the data driver may detect a sensing voltage variance from the sensing transistor for the sensing period, and the sensing voltage variance may be a difference voltage of the first sensing voltage and a reference voltage.

A first threshold voltage variance of the first driving transistor may be smaller than a second threshold voltage variance of the second driving transistor.

The display device may further include a light emitting diode which is electrically connected to the source electrode of the second driving transistor.

The second threshold voltage variance may be a value obtained by adding prediction information to the first threshold voltage variance and the prediction information may be a difference value of the first threshold voltage variance and the second threshold voltage variance according to a stress bias and a time.

According to an aspect of the present disclosure, a luminance difference compensating method of a display device includes measuring a sensing voltage variance at a node between a drain electrode of a first driving transistor and a source electrode of a second driving transistor of a sub pixel, calculating a first threshold voltage variance of the first driving transistor from the sensing voltage variance, calculating a second threshold voltage variance of the second driving transistor from the first threshold voltage variance and a prediction information, compensating for a first data voltage based on the first threshold voltage variance to apply the compensated first data voltage to the first driving transistor, and compensating for a second data voltage based on the second threshold voltage variance to apply the compensated second data voltage to the second driving transistor, the prediction information is a difference value of the first threshold voltage variance and the second threshold voltage variance according to a stress bias and a time.

The measuring of a sensing voltage variance may include initializing the node with a reference voltage, allowing a current to flow from the node to the first driving transistor by turning on the first driving transistor, allowing a current to flow from the node to the second driving transistor by turning on the second driving transistor, and measuring a voltage of the node as the sensing voltage after turning off the first driving transistor and the second driving transistor, the sensing voltage variance may be a difference value of the reference voltage and the sensing voltage.

The first threshold voltage variance of the first driving transistor may be smaller than the second threshold voltage variance, the second threshold voltage variance of the second driving transistor and the sensing voltage may be a first sensing voltage between the first sensing voltage for the first driving transistor and a second sensing voltage for the second driving transistor.

The luminance difference compensating method of a display device may further include extracting the prediction information from a memory by means of data counting, the data counting may be a step of analyzing an image displayed on the display device to detect a data voltage applied to the first driving transistor and the second driving transistor and an applying time of the data voltage, and the prediction information may be a difference value of the first threshold voltage variance and the second threshold voltage variance corresponding to the data voltage detected by means of the data counting and the applying time.

The calculating of the second threshold voltage variance may be a step of calculating the second threshold voltage variance by adding the first threshold voltage variance and the prediction information.

According to another aspect of the present disclosure, a display device includes a display panel in which a plurality of sub pixels is defined, each of the plurality of sub pixels includes a first circuit unit including a first driving transistor, a second circuit unit which includes a second driving transistor and is connected to the first circuit unit, and a sensing transistor connected to the first circuit unit and the second circuit unit, and the sensing transistor is connected to both the first driving transistor and the second driving transistor.

Each of the plurality of sub pixels may further include a light emitting diode having a cathode which is connected to the second driving transistor of the second circuit unit and the light emitting diode may be configured to be supplied with a driving current from the first circuit unit and the second circuit unit.

The first circuit unit may be a pulse width modulation (PWM) circuit configured to control a pulse width of the driving current and the second circuit unit may be a pulse amplitude modulation (PAM) circuit configured to control an amplitude of the driving current.

The display device may further include a data driver connected to the display panel, the sensing transistor may be configured to simultaneously transmit a first sensing voltage from the first driving transistor and a second sensing voltage from the second driving transistor to the data driver.

The display panel may further include a first power line which is connected to the first driving transistor and an anode of the light emitting diode, and a second power line which is connected to a drain electrode of the second driving transistor, and the same power voltage may be applied to the first power line and the second power line for a period when the sensing transistor transmits the first sensing voltage and the second sensing voltage to the data driver and different power voltages may be applied to the first power line and the second power line for a period when the light emitting diode emits light.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope of the present disclosure should be construed as falling within the scope of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel which includes a plurality of sub pixels;

a data driver connected to the display panel;

a first circuit unit which is disposed in each of the plurality of sub pixels and includes a first driving transistor;

a second circuit unit which is disposed in each of the plurality of sub pixels and includes a second driving transistor;

a sensing transistor which is connected to a drain electrode of the first driving transistor and a source electrode of the second driving transistor;

a first power line connected to a source electrode of the first driving transistor; and a second power line connected to a drain electrode of the second driving transistor, wherein the plurality of sub pixels are configured to be driven in an emission period and a sensing period and the sensing transistor is configured to detect a greater one of a first sensing voltage of the drain electrode of the first driving transistor or a second sensing voltage of the source electrode of the second driving transistor that overlap one another in time, wherein the first power line is configured to supply a low potential power voltage for the sensing period and configured to supply a high potential power voltage for the emission period, and the second power line is configured to supply the low potential power voltage for the sensing period and the emission period.

2. The display device according to claim 1, wherein during the sensing period, a current flows from the first driving transistor to the first power line and a current flows from the second driving transistor to the second power line.

3. The display device according to claim 1, wherein the sensing transistor is connected to the data driver, the data driver is configured to detect a sensing voltage variance from the sensing transistor for the sensing period, and the sensing voltage variance is a difference between the first sensing voltage and a reference voltage.

4. The display device according to claim 3, wherein a first threshold voltage variance of the first driving transistor is smaller than a second threshold voltage variance of the second driving transistor.

5. The display device according to claim 4, further comprising:

a light emitting diode electrically connected to the source electrode of the second driving transistor.

6. The display device according to claim 4, wherein the second threshold voltage variance is a value obtained by adding prediction information to the first threshold voltage variance and the prediction information is a difference value of the first threshold voltage variance and the second threshold voltage variance configured based on a stress bias and a time.

7. A luminance difference compensating method of a display device, comprising:

measuring a sensing voltage variance at a node between a drain electrode of a first driving transistor and a source electrode of a second driving transistor of a sub pixel;

calculating a first threshold voltage variance of the first driving transistor from the sensing voltage variance;

calculating a second threshold voltage variance of the second driving transistor from the first threshold voltage variance and a prediction information;

compensating for a first data voltage based on the first threshold voltage variance to apply the compensated first data voltage to the first driving transistor; and compensating for a second data voltage based on the second threshold voltage variance to apply the compensated second data voltage to the second driving transistor, wherein the prediction information is a difference value of the first threshold voltage variance and the second threshold voltage variance determined based on a stress bias and a time.

8. The luminance difference compensating method of a display device according to claim 7, wherein the measuring of a sensing voltage variance includes:

initializing the node with a reference voltage;

allowing a current to flow from the node to the first driving transistor by turning on the first driving transistor;

allowing a current to flow from the node to the second driving transistor by turning on the second driving transistor; and measuring a voltage of the node as the sensing voltage after turning off the first driving transistor and the second driving transistor, wherein the sensing voltage variance is a difference value between the reference voltage and the sensing voltage.

9. The luminance difference compensating method of a display device according to claim 8, wherein the first threshold voltage variance of the first driving transistor is smaller than the second threshold voltage variance of the second driving transistor and the sensing voltage is a first sensing voltage between the first sensing voltage for the first driving transistor and a second sensing voltage for the second driving transistor.

10. The luminance difference compensating method of a display device according to claim 9, further comprising:

extracting the prediction information from a memory by means of data counting, wherein the data counting includes analyzing an image displayed on the display device to detect a data voltage applied to the first driving transistor and the second driving transistor and an applying time of the data voltage, and the prediction information is a difference value of the first threshold voltage variance and the second threshold voltage variance corresponding to the data voltage detected by means of the data counting and the applying time.

11. The luminance difference compensating method of a display device according to claim 10, wherein the calculating the second threshold voltage variance includes calculating the second threshold voltage variance by adding the first threshold voltage variance and the prediction information.

12. A display device, comprising:

a display panel including a plurality of sub pixels; and a data driver connected to the display panel, wherein each of the plurality of sub pixels includes:

a first circuit unit including a first driving transistor;

a second circuit unit including a second driving transistor, the second circuit unit connected to the first circuit unit; and a sensing transistor connected to the first driving transistor and the second driving transistor; and a light emitting diode having a cathode connected to the second driving transistor of the second circuit unit, wherein the light emitting diode is configured to be supplied with a driving current from the first circuit unit and the second circuit unit, wherein the sensing transistor is configured to simultaneously transmit a first sensing voltage from the first driving transistor and a second sensing voltage from the second driving transistor to the data driver.

13. The display device according to claim 12, wherein the first circuit unit is a pulse width modulation (PWM) circuit configured to control a pulse width of the driving current and the second circuit unit is a pulse amplitude modulation (PAM) circuit configured to control an amplitude of the driving current.

14. The display device according to claim 12, wherein the display panel further includes:

a first power line connected to the first driving transistor and an anode of the light emitting diode; and a second power line connected to a drain electrode of the second driving transistor, and a same power voltage is configured to be applied to the first power line and the second power line for a period when the sensing transistor transmits the first sensing voltage and the second sensing voltage to the data driver and different power voltages are configured to be applied to the first power line and the second power line for a period when the light emitting diode emits light.

15. A display device, comprising:

a display panel including a plurality of sub pixels;

a data driver connected to the plurality of sub pixels;

a sensing unit connected to the data driver, wherein each of the plurality of sub pixels includes:

a light emitting device;

a first driving transistor, a drain terminal of the first driving transistor connected to a first electrode of the light emitting device;

a second driving transistor, a source terminal of the second driving transistor connected to the first electrode of the light emitting device; and wherein the sensing unit is connected to detect a voltage at the first electrode of the light emitting device, wherein the display panel further includes:

a first power line connected to a source electrode of the first driving transistor; and a second power line connected to a drain electrode of the second driving transistor, wherein the first power line is configured to supply a low potential power voltage for the sensing period and configured to supply a high potential power voltage for the emission period, and the second power line is configured to supply the low potential power voltage for the sensing period and the emission period.

16. The display device of claim 15, wherein the sensing unit includes:

a sensing transistor connected between a node and the first electrode of the light emitting device; and a first transistor connected between the node and a reference voltage terminal.

17. The display device of claim 16, wherein the sensing unit includes a capacitor connected to the node.

* * * * *